United States Patent
Wagner et al.

(10) Patent No.: US 10,335,956 B2
(45) Date of Patent: *Jul. 2, 2019

(54) SYSTEMS AND METHODS FOR ACQUIRING AND MOVING OBJECTS

(71) Applicant: Berkshire Grey, Inc., Lexington, MA (US)

(72) Inventors: Thomas Wagner, Concord, MA (US); Kevin Ahearn, Camden, SC (US); Benjamin Cohen, Somerville, MA (US); Michael Dawson-Haggerty, Pittsburgh, PA (US); Christopher Geyer, Arlington, MA (US); Thomas Koletschka, Cambrdige, MA (US); Kyle Maroney, North Attleboro, MA (US); Matthew T. Mason, Pittsburgh, PA (US); Gene Temple Price, Somerville, MA (US); Joseph Romano, Somerville, MA (US); Daniel Smith, Pittsburgh, PA (US); Siddhartha Srinivasa, Pittsburgh, PA (US); Prasanna Velagapudi, Pittsburgh, PA (US); Thomas Allen, Reading, MA (US)

(73) Assignee: Berkshire Grey, Inc., Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/992,841

(22) Filed: May 30, 2018

(65) Prior Publication Data
US 2019/0001505 A1    Jan. 3, 2019

Related U.S. Application Data

(63) Continuation of application No. 15/371,921, filed on Dec. 7, 2016, now Pat. No. 10,011,020.
(Continued)

(51) Int. Cl.
*B25J 15/00* (2006.01)
*B25J 15/06* (2006.01)
*B25J 15/10* (2006.01)

(52) U.S. Cl.
CPC ....... *B25J 15/0033* (2013.01); *B25J 15/0023* (2013.01); *B25J 15/0052* (2013.01);
(Continued)

(58) Field of Classification Search
CPC  B25J 15/0004; B25J 15/0023; B25J 15/0033; B25J 15/0052; B25J 15/0095;
(Continued)

(56) References Cited

U.S. PATENT DOCUMENTS 3,005,652 A * 10/1961 Helm .................... B66C 1/0212
                                                    294/189
4,389,064 A *  6/1983 Laverriere ............. B66C 1/025
                                                    209/905
(Continued)

FOREIGN PATENT DOCUMENTS

DE        3810989 A1    8/1989
DE       10121344 A1   11/2002
(Continued)

OTHER PUBLICATIONS

Herbert et al., "A Robotic Gripper System for Limp Material Manipulation: Hardware and Software Development and Integration", Proc. of IEEE—Int'l Conf on Robotics & Automation, Apr. 1997 (pp. 15-21).
(Continued)

*Primary Examiner* — Dean J Kramer
(74) *Attorney, Agent, or Firm* — Gesmer Updegrove LLP

(57) ABSTRACT

An end effector system is disclosed for a robotic system that includes a primary acquisition system that includes a primary end effector, and a secondary retention system that
(Continued)

substantially surrounds at least a portion of the primary acquisition system, wherein at least a portion of the primary acquisition system may be drawn up within at least a portion of the secondary retention system such that the primary end effector system may be used to select an object from a plurality of objects, and the secondary retention system may be used to secure the object for rapid transport to an output destination.

23 Claims, 18 Drawing Sheets

Related U.S. Application Data

(60) Provisional application No. 62/276,653, filed on Jan. 8, 2016.

(52) U.S. Cl.
CPC ....... *B25J 15/0095* (2013.01); *B25J 15/0616* (2013.01); *B25J 15/10* (2013.01); *Y10S 901/40* (2013.01)

(58) Field of Classification Search
CPC ........ B25J 15/0616; B25J 15/10; B25J 15/12; B25J 11/0045; Y10S 901/39; Y10S 901/40
USPC .............................................. 294/2, 86.4, 185
See application file for complete search history.

(56) References Cited

U.S. PATENT DOCUMENTS

| | | | |
|---|---|---|---|
| 4,469,100 A * | 9/1984 | Hardwick | A61B 17/22032 604/908 |
| 4,557,659 A * | 12/1985 | Scaglia | B65G 47/91 254/270 |
| 4,561,686 A * | 12/1985 | Atchley | B66C 1/0206 294/188 |
| 4,578,013 A | 3/1986 | Barillec et al. | |
| 4,653,793 A | 3/1987 | Guinot et al. | |
| 4,677,778 A | 7/1987 | Sorimachi et al. | |
| 4,681,063 A * | 7/1987 | Hebrank | B65G 47/915 119/6.8 |
| 4,850,627 A * | 7/1989 | Franklin | B65B 35/38 294/2 |
| 4,880,358 A * | 11/1989 | Lasto | F04F 5/22 417/174 |
| 5,024,575 A * | 6/1991 | Anderson | B65G 47/90 294/2 |
| 5,226,757 A * | 7/1993 | Tarrant | B60P 3/00 15/340.1 |
| 5,752,729 A * | 5/1998 | Crozier | B25B 11/007 294/188 |
| 5,764,013 A * | 6/1998 | Yae | B25J 9/042 318/568.11 |
| 5,777,267 A * | 7/1998 | Szydel | B25J 19/0025 174/72 A |
| 5,865,487 A * | 2/1999 | Gore | B25J 15/06 294/2 |
| 6,244,640 B1 * | 6/2001 | Le Bricquer | B65G 47/91 294/185 |
| 6,397,876 B1 * | 6/2002 | Golden | F04F 5/52 137/14 |
| 6,721,444 B1 | 4/2004 | Gu et al. | |
| 6,817,639 B2 | 11/2004 | Schmalz et al. | |
| 6,846,029 B1 * | 1/2005 | Ragner | B25B 9/00 294/219 |
| 6,994,387 B1 | 2/2006 | Ragner et al. | |
| 7,004,524 B2 | 2/2006 | Marshall | |
| 7,140,389 B2 * | 11/2006 | Schnatterer | F04F 5/20 137/565.23 |
| 7,263,890 B2 * | 9/2007 | Takahashi | B25J 15/0616 73/700 |
| 7,313,464 B1 | 12/2007 | Perreault et al. | |
| 7,474,939 B2 | 1/2009 | Oda et al. | |
| 7,677,622 B2 * | 3/2010 | Dunkmann | B65G 47/917 294/188 |
| 7,726,716 B2 | 6/2010 | Shuttleworth | |
| 7,785,422 B2 * | 8/2010 | Autumn | B08B 7/0028 134/32 |
| 8,070,203 B2 * | 12/2011 | Schaumberger | B66C 1/0218 294/183 |
| 8,096,598 B2 * | 1/2012 | Perlman | B25B 11/007 294/64.2 |
| 8,132,835 B2 * | 3/2012 | Ban | B25J 15/0616 294/183 |
| 8,267,386 B2 * | 9/2012 | Schaaf | B65G 47/91 269/20 |
| 8,548,626 B2 * | 10/2013 | Steltz | B25J 15/0023 294/192 |
| 8,662,861 B2 * | 3/2014 | Tell | B25J 15/0675 294/189 |
| 8,777,284 B2 | 7/2014 | Schaller et al. | |
| 8,874,270 B2 | 10/2014 | Ando | |
| 9,061,868 B1 * | 6/2015 | Paulsen | B66C 1/0218 |
| 9,227,323 B1 | 1/2016 | Konolige et al. | |
| 9,259,844 B2 | 2/2016 | Xu et al. | |
| 9,266,237 B2 | 2/2016 | Nomura | |
| 9,283,680 B2 | 3/2016 | Yasuda et al. | |
| 9,492,923 B2 | 11/2016 | Wellman et al. | |
| 9,604,363 B2 | 3/2017 | Ban | |
| 9,623,570 B1 * | 4/2017 | Krahn | B25J 15/0023 |
| 10,011,020 B2 * | 7/2018 | Wagner | B25J 15/0023 |
| 2001/0045755 A1 * | 11/2001 | Schick | B25J 15/06 294/65 |
| 2003/0038491 A1 * | 2/2003 | Schmalz | B25B 11/005 294/185 |
| 2003/0160470 A1 * | 8/2003 | Marshall | B25B 9/00 294/86.4 |
| 2003/0164620 A1 * | 9/2003 | Schmalz | B25J 15/0616 294/188 |
| 2004/0169386 A1 * | 9/2004 | Shuttleworth | E01H 1/1206 294/137 |
| 2004/0232716 A1 * | 11/2004 | Reed | B25J 15/00 294/86.4 |
| 2008/0179224 A1 * | 7/2008 | Van Bossuyt | G01R 31/01 209/573 |
| 2008/0181485 A1 | 7/2008 | Beis et al. | |
| 2009/0019818 A1 * | 1/2009 | Gilmore | B25J 15/0052 53/475 |
| 2010/0040450 A1 | 2/2010 | Parnell | |
| 2010/0109360 A1 * | 5/2010 | Meisho | B23P 19/105 294/86.4 |
| 2010/0175487 A1 * | 7/2010 | Sato | G01L 1/14 73/862.69 |
| 2010/0180711 A1 * | 7/2010 | Kilibarda | B05C 5/0216 74/490.06 |
| 2010/0241260 A1 * | 9/2010 | Kilibarda | B25J 9/1602 700/95 |
| 2011/0126681 A1 * | 6/2011 | Blanchet | B26D 1/24 83/51 |
| 2013/0110280 A1 | 5/2013 | Folk | |
| 2013/0129464 A1 * | 5/2013 | Regan | B25J 15/0691 414/800 |
| 2013/0232918 A1 * | 9/2013 | Lomerson, Jr. | B25J 15/0052 53/452 |
| 2013/0245824 A1 | 9/2013 | Barajas et al. | |
| 2013/0277999 A1 * | 10/2013 | Schaller | H01L 21/6838 294/186 |
| 2013/0343640 A1 | 12/2013 | Buehler et al. | |
| 2014/0005831 A1 * | 1/2014 | Naderer | B25J 9/1633 700/258 |
| 2014/0067121 A1 | 3/2014 | Brooks et al. | |
| 2014/0067127 A1 | 3/2014 | Gotou | |
| 2014/0260678 A1 | 9/2014 | Jentoft et al. | |
| 2014/0305847 A1 | 10/2014 | Kudrus | |
| 2015/0032252 A1 * | 1/2015 | Galluzzo | B25J 5/007 700/218 |

(56) References Cited

U.S. PATENT DOCUMENTS

| | | | |
|---|---|---|---|
| 2015/0073589 A1* | 3/2015 | Khodl | B25J 5/007 |
| | | | 700/218 |
| 2015/0224650 A1 | 8/2015 | Xu et al. | |
| 2015/0298316 A1* | 10/2015 | Accou | H05K 13/0408 |
| | | | 414/752.1 |
| 2015/0328779 A1 | 11/2015 | Bowman et al. | |
| 2015/0375401 A1* | 12/2015 | Dunkmann | B65G 47/91 |
| | | | 700/228 |
| 2016/0243704 A1 | 8/2016 | Vakanski et al. | |
| 2017/0021499 A1 | 1/2017 | Wellman et al. | |
| 2017/0036354 A1 | 2/2017 | Chavan Dafle et al. | |
| 2017/0050315 A1* | 2/2017 | Henry | B25J 9/1687 |

FOREIGN PATENT DOCUMENTS

| | | |
|---|---|---|
| DE | 102005018207 A1 | 10/2006 |
| DE | 102007028680 A1 | 12/2008 |
| DE | 102007054867 A1 | 5/2009 |
| DE | 102010002317 A1 | 8/2011 |
| DE | 102012009011 A1 | 12/2012 |
| DE | 102011115951 A1 | 4/2013 |
| EP | 1256421 A1 | 11/2002 |
| EP | 1348873 A1 | 10/2003 |
| EP | 1671906 A1 | 6/2006 |
| EP | 2181814 A1 | 5/2010 |
| EP | 2960024 A2 | 12/2015 |
| FR | 2527968 A1 | 12/1983 |
| FR | 2592827 A1 | 7/1987 |
| JP | 6155399 A | 3/1986 |
| JP | 2010201536 A | 9/2010 |
| WO | 2012127102 A1 | 9/2012 |
| WO | 2014161549 A1 | 10/2014 |
| WO | 2015162390 A1 | 10/2015 |
| WO | 2016070412 A1 | 5/2016 |
| WO | 2016100235 A1 | 6/2016 |

OTHER PUBLICATIONS

Moura et al., "Neural Network Based Perturbation Identification Approach for High Accuracy Tracking Control of Robotic Manipulators", Proc. of IMECE—ASME Int'l Mech. Eng. Cong., Nov. 2003 (pp. 1189-1197).

Vittor et al., "A Flexible Robotic Gripper for Automation of Assembly Tasks: A Technology Study on a Gripper for Operation in Shared Human Environment", Proc. of ASME—Dynamic Sys. and Control Div., DSC-vol. 72-2, Nov. 2003 (7 pp.).

International Search Report & Written Opinion issued by the International Searching Authority in related International Patent Application No. PCT/US2016/065371 dated Mar. 1, 2017, 13 pgs.

Liu et al., "Hand-Arm Coordination for a Tomato Harvesting Robot Based on Commercial Manipulator", Proc. of IEEE—Int'l Conf. on Robotics and Biometrics, Dec. 2013 (pp. 2715-2720).

Klingbeil, Ellen, et al., "Grasping with Application to an Autonomous Checkout Robot", Procedings—IEEE Int'l Conf. on Robotics and Automation, pp. 2837-2844 (May 9, 2011).

Carlisle, et al., "A Pivoting Gripper for Feeding Industrial Parts", Robotics and Automation, 1994 Proc. of IEEE Int'l Conf., May 8, 1994 (pp. 1650-1655).

* cited by examiner

SYSTEMS AND METHODS FOR ACQUIRING AND MOVING OBJECTS

PRIORITY

The present application is a continuation application of U.S. patent application Ser. No. 15/371,921, filed Dec. 7, 2016, which claims priority to U.S. Provisional Patent Application Ser. No. 62/276,653 filed Jan. 8, 2016, the disclosures of both of which are hereby incorporated by reference in their entireties.

BACKGROUND

The invention generally relates to programmable motion systems and relates in particular to end effectors for programmable motion devices (i.e., robotic systems) for use in object processing such as object sortation.

End effectors for robotic systems, for example, may be employed in certain applications to select and grasp an object, and then move the acquired object very quickly to a new location. End effectors that are designed to very securely grasp an object during movement may have limitations regarding how quickly and easily they may select and grasp an object from a jumble of dissimilar objects. Conversely, end effectors that may quickly and easily grasp a selected object from a jumble of dissimilar objects may have limitations regarding how securely they may grasp an acquired object during rapid movement, particularly rapid acceleration and deceleration (both angular and linear).

Many end effectors employ vacuum pressure for acquiring and securing objects for transport or subsequent operations by articulated arms. Other techniques for acquiring and securing objects employ electrostatic attraction, magnetic attraction, needles for penetrating objects such as fabrics, fingers that squeeze an object, hooks that engage and lift a protruding feature of an object, and collets that expand in an opening of an object, among other techniques. Typically, end effectors are designed as a single tool, such as for example, a gripper, a welder, or a paint spray head, and the tool is typically designed for a specific set of needs.

There remains a need therefore, for an end effector in a programmable motion system that may select and grasp an object, and then move the acquired object very quickly to a new location.

SUMMARY

In accordance with an embodiment, the invention provides an end effector system for a robotic system. The end effector system includes a primary acquisition system that includes a primary end effector, and a secondary retention system that substantially surrounds at least a portion of the primary acquisition system, wherein at least a portion of the primary acquisition system may be drawn up within at least a portion of the secondary retention system such that the primary end effector system may be used to select an object from a plurality of objects, and the secondary retention system may be used to secure the object for rapid transport to an output destination.

In accordance with another embodiment, the invention provides an end effector system for a robotic system. The end effector system includes a primary acquisition system that includes a primary end effector, and a secondary retention system proximate to the primary gripper system such that the primary end effector system may be used to select an object from a plurality of objects, and the secondary retention system may be used to retain the object for rapid transport to an output destination.

In accordance with a further embodiment, the invention provides a method of engaging and moving an object using a robotic system. The method includes the steps of engaging the object with a primary end effector of a primary acquisition system, moving the object toward a secondary retention system, retaining the object with the secondary retention system, and transporting the object to an output destination.

BRIEF DESCRIPTION OF THE DRAWINGS

The following description may be further understood with reference to the accompanying drawings in which.

The drawings are shown for illustrative purposes only.

DETAILED DESCRIPTION

In accordance with various embodiments, the invention provides end effector systems that include two elements, one element for acquisition, and one element for secure holding during transportation. The acquisition element may be specialized to address challenges of acquisition, which may include perception of a desired object, separating the object from supporting or surrounding objects, and shifting the object to a position and orientation suited for transportation.

The secure holding element may be specialized to address challenges of transportation, which may include security and stability during transport, despite gravitational forces, high speed acceleration, centrifugal forces, and contact with surrounding objects.

Generally and in certain embodiments, the invention provides an end effector system for a robotic system, e.g., an articulated arm robotic system or any of a delta, gantry, spherical, SCARA, or cylindrical robotic systems. The end effector system includes a primary gripper system and a secondary retention system that substantially surrounds at least a portion of the primary gripper system. In certain embodiments, at least a portion of the primary gripper system may be drawn up within at least a portion of the secondary retention system such that the primary gripper system may be used to select an object from a plurality of objects, and the secondary retention system may be used to secure the object for rapid transport to an output destination.

More generally, and in accordance with a further embodiment, the invention provides a method of engaging and moving an object using a robotic system. The method includes the steps of engaging the object with a primary gripper system, moving the object toward a secondary retention system, retaining the object with the secondary retention system, and transporting the object to an output destination.

Figure 1:
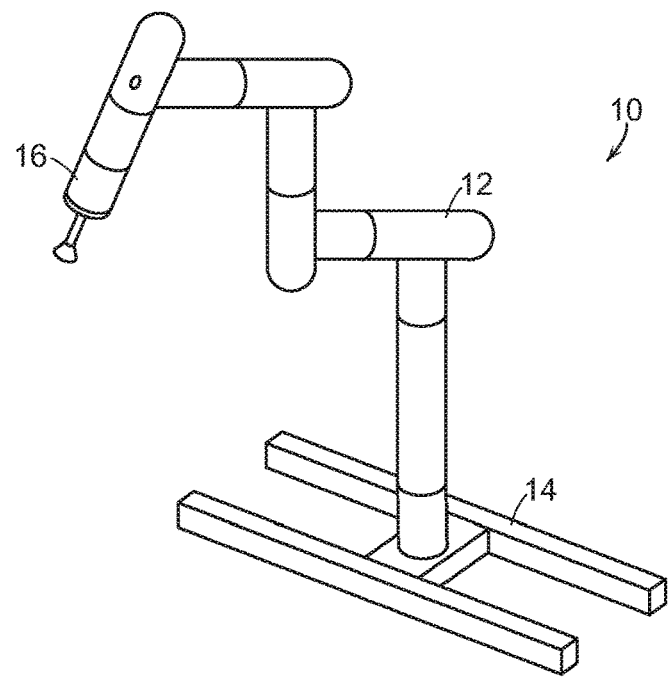
FIG. 1 shows an illustrative diagrammatic view of a system in accordance with an embodiment of the present invention.
Figure 2:
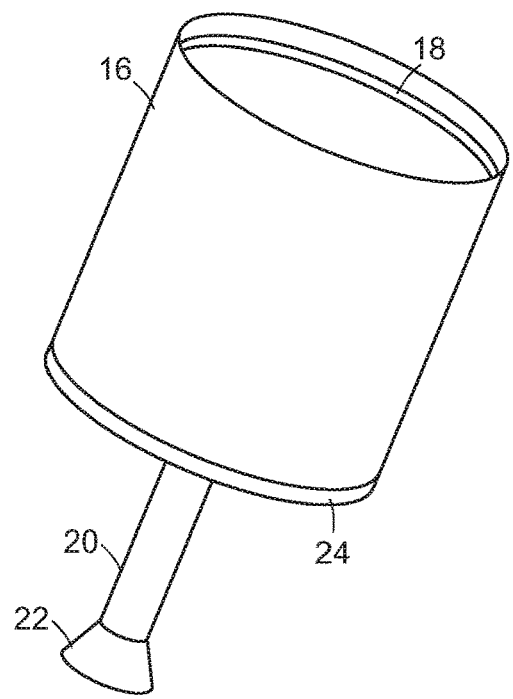
FIG. 2 shows an illustrative diagrammatic view of an end effector portion of the system of FIG. 1.

FIG. 1 shows a robotic system 10 in accordance with embodiments of the invention that includes an articulated arm 12 on a base 14, and an end effector system 16. As further shown in FIG. 2, the end effector system may attach to the articulated arm 12 by way of an engagement feature 18 (such as threads, spring-loaded clasp, or ball and socket engagement) that mate with an engagement feature on the articulated arm 12, and further, the end effector system may include a primary gripper system including a gripper 22 on the end of an extender 20, as well as secondary retention system 24 as discussed in more detail below. As each of the acquisition element and the secure holding element may vary, and many different embodiments are possible. The gripper in each of the embodiments, for example, may be any of a vacuum gripper, an electrostatic gripper, or a magnetic gripper etc.

Figure 3A:
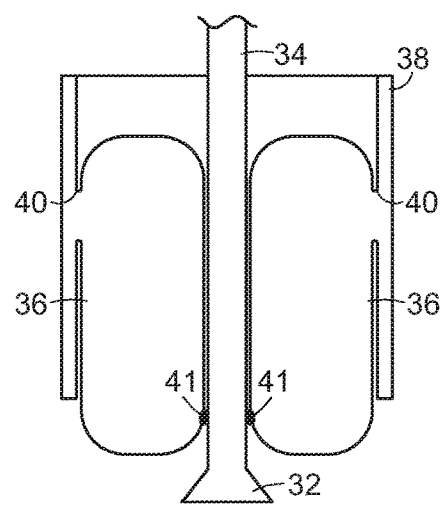
FIGS. 3A-3C show illustrative diagrammatic sectional views of the end effector portion in accordance with an embodiment including a tubular annulus during acquisition and retention of an object.
Figure 3C:
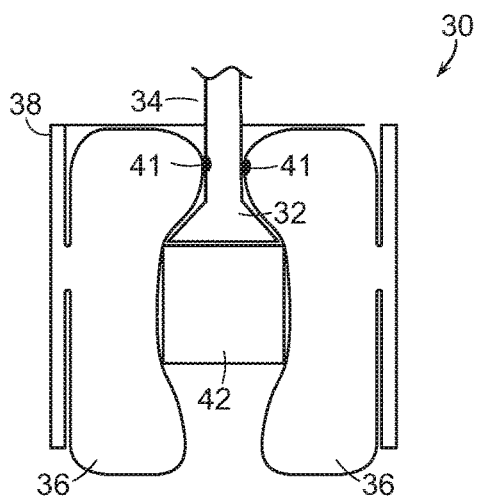
Figure 3B:
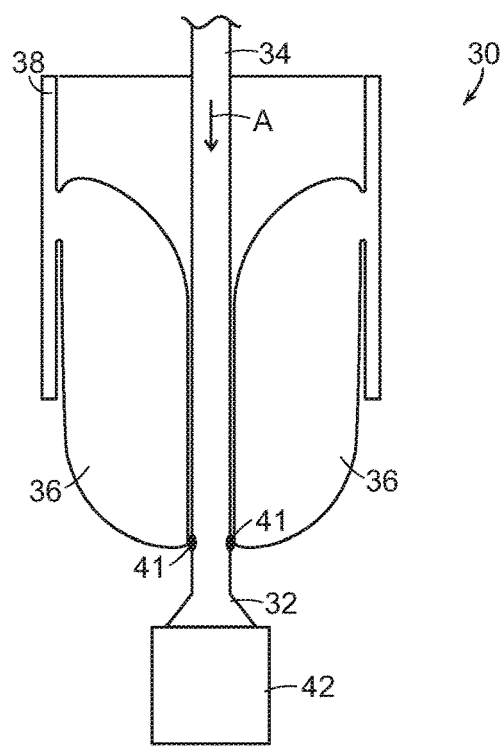

FIGS. 3A-3C diagrammatically show sectional views of an end effector system 30 in accordance with an embodiment of the present invention that includes a primary gripper system including a gripper 32 on the end of an extender 34. The end effector system 30 also includes a secondary retention system including a flexible toroid 36.

The flexible toroid is a fluid-filled or powder filled (and optionally elastic) flexible membrane that is compressed and inverted as it is drawn into the center of the supporting structure. Such a device is formed of a continuous sheet of fabric that is in the form of a torus, or an annulus that extends along the direction that extends through the center of the annulus.

As shown in FIG. 3A, a portion of the outer surface of the flexible toroid 36 is attached to the inner surface of the housing 38 as shown at 40, and a portion of the inner surface of the elastic toroid is attached to the extender at 41. The toroid is able to move up and down (by rolling) between the outer collar and the inner extender.

With reference to FIG. 3B, the extender 34 may be moved in the direction as indicated at A such that the vacuum gripper 32 engages an object to be grasped 42. By supplying a vacuum source through the extender 34, the object may be engaged. As further shown in FIG. 3B, when the extender 34 is moved in the direction as indicated at A, it draws the inner surface of the elastic toroid with it, which causes one end of the elastic toroid to roll inward upon itself in direction A, while the opposing end of the elastic toroid will roll outward. While the elastic toroid 36 undergoes this process of everting, it remains attached to the housing 38 at the attachment 40.

As shown in FIG. 3C, when the engaged object is pulled into the elastic toroid, the object is securely engaged for transport or other processing operations. By controlling the movement of the elastic toroid as described above, the end effector may be used to draw the object 42 into the elastic toroid and hold it within the elastic toroid until the linear actuator is moved in a direction that is opposite the direction indicated at A (and the object 42 is discharged). The elastic toroid is formed of a flexible material that may conform to the shape of the object 42 being grasped. The fluid (or powder) within the elastic toroid may be water (or plastic particles) or may be selected to have a particular viscosity.

Figure 4A:
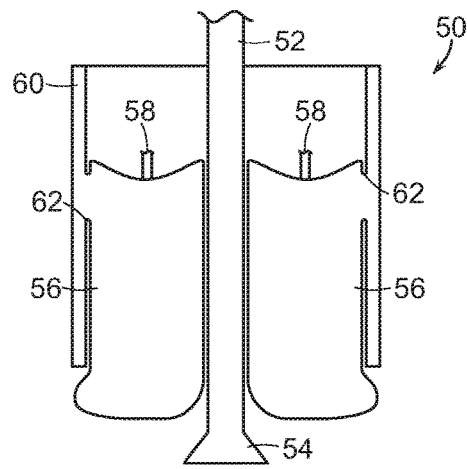
FIGS. 4A-4D show illustrative diagrammatic sectional views of the end effector portion in accordance with another embodiment including a jamming gripper during acquisition and retention of an object.
Figure 4C:
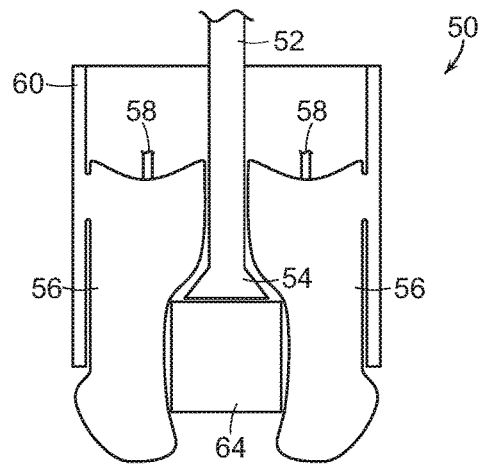
Figure 4B:
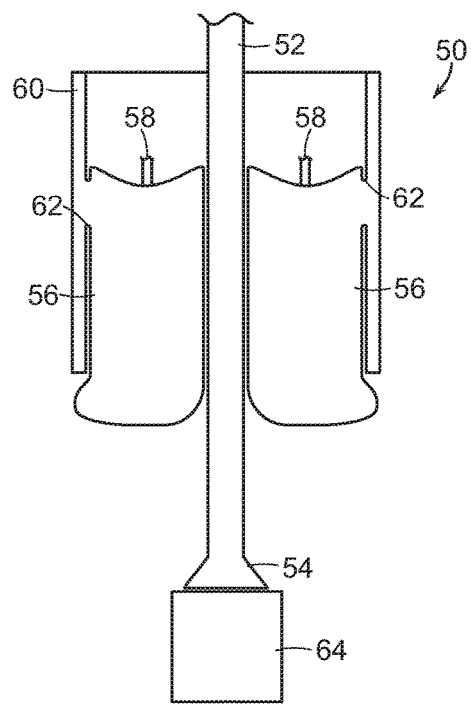

As shown in FIGS. 4A-4C (which show diagrammatic sectional views), an end effector system 50 in accordance with another embodiment of the present invention includes a primary gripper system including a gripper 52 on the end of an extender 54. The end effector system 50 also includes a secondary retention system including a jamming gripper 56 having one or more vacuum attachment ports 58. Generally, the jamming gripper encloses a fluid or volume of particles having a very small size (e.g., powder) such that when a vacuum source is provided to the ports 58, the jamming gripper 56 reduces its volume and grabs any object within its outer edge. The jamming gripper 56 is also attached to the interior of the housing 60 as shown at 62.

Figure 4D:
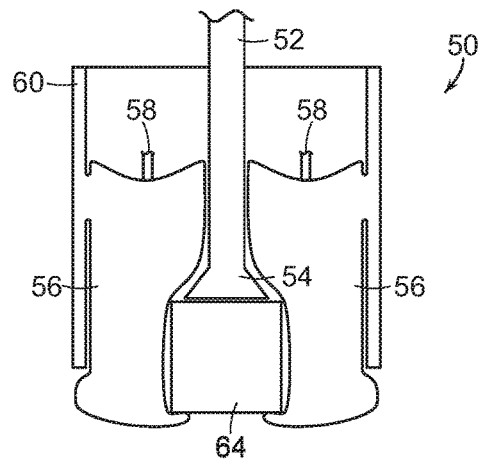

As shown in FIG. 4B, the extender 54 may be extended, permitting the gripper 54 to engage an object 64, and as shown in FIG. 4C, when the object is drawn up near or into the jamming gripper 56, the jamming gripper engages at least a portion of the outer surface of the object 64. As shown in FIG. 4D, when the vacuum source is applied to the jamming gripper 56, the gripper 56 conforms to the surface of the object 64, thereby securing the object 56 for transport or other processing operations.

In each of the embodiments of FIG. 3A-4D, the secondary retention system may have difficulty engaging an object from an input area, but when combined with the primary gripper system, the end effector systems may acquire an object and subsequently securely retain the object, even when the end effector system undergoes rapid linear and angular acceleration or deceleration.

Figure 5A:
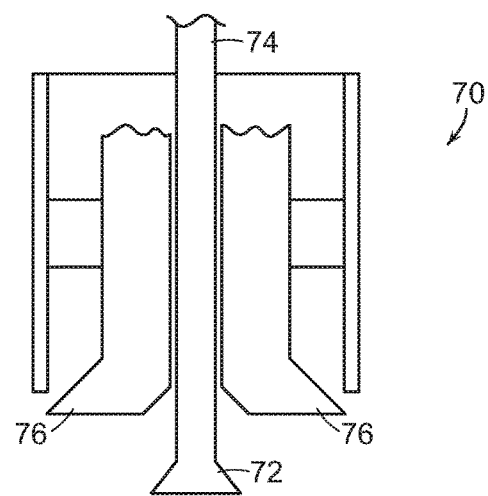
FIGS. 5A-5C show illustrative diagrammatic sectional views of the end effector portion in accordance with a further embodiment including vacuum cups during acquisition and retention of an object.
Figure 5B:
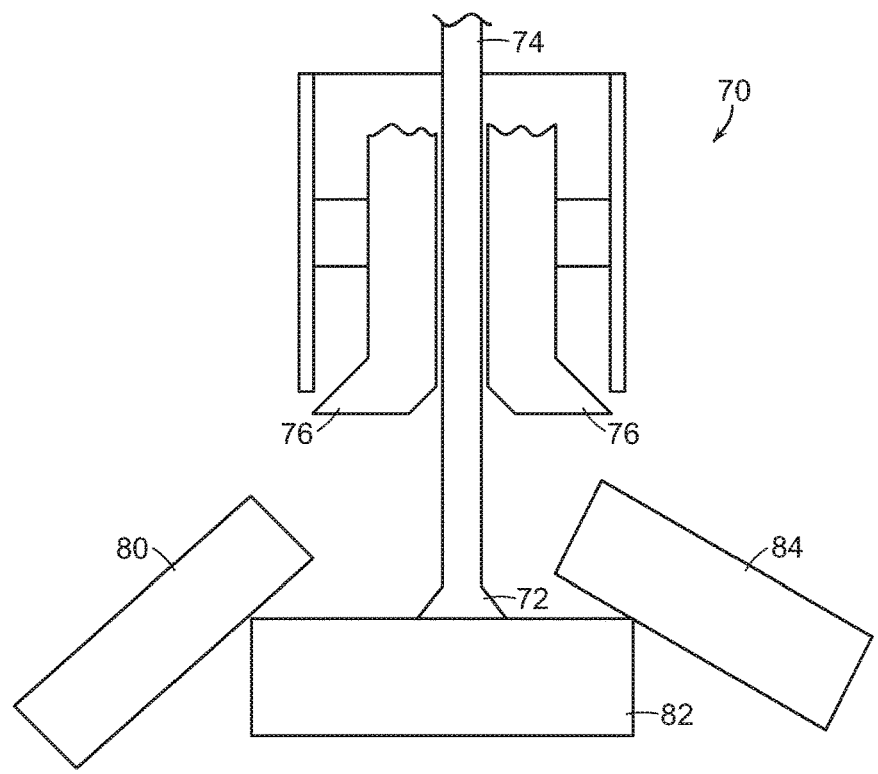
Figure 5C:
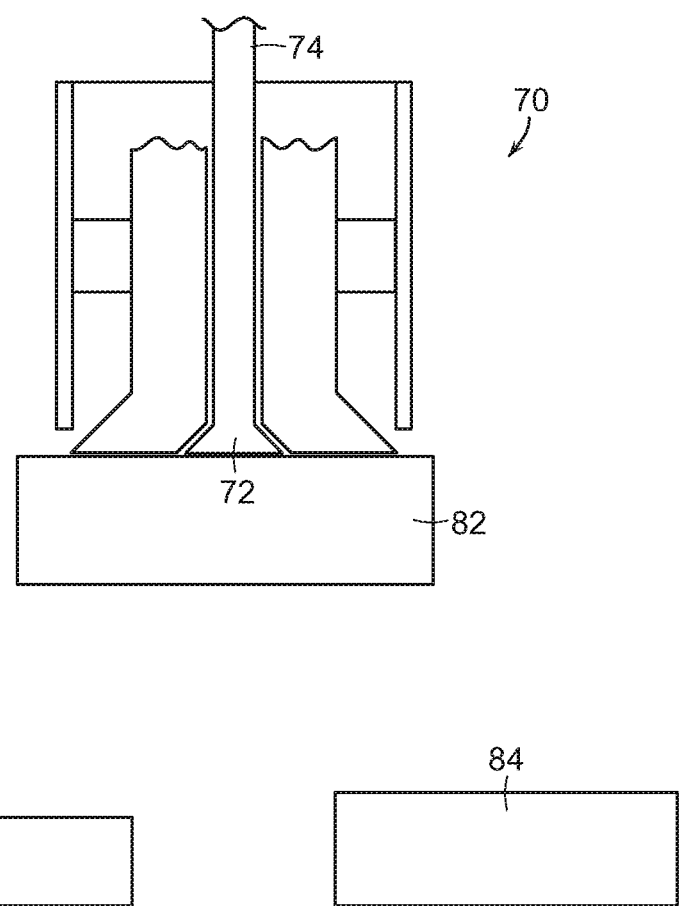

As shown in FIGS. 5A-5C (which show diagrammatic sectional views), an end effector system 70 in accordance with another embodiment of the present invention includes a primary gripper system including a gripper 72 on the end of an extender 74. The gripper 72 may be any of a vacuum gripper, an electrostatic gripper, or a magnetic gripper etc. The end effector system 70 also includes a secondary retention system including a large area gripper 76 (e.g., a vacuum gripper, an electrostatic gripper, or a magnetic gripper etc.) that surrounds the extender 74. As shown in FIG. 5B, when the gripper 72 is extended into a cluttered environment (including, e.g., objects 80, 82, 84), the gripper 72 may engage an object 82, and draw the object toward the large area gripper 76, which then surrounds the gripper 72. The large area gripper 76 is then employed during rapid transport or further processing operations.

FIGS. 6A-6D show a diagrammatic sectional view of an end effector system 90 in accordance with another embodiment of the present invention, which includes a primary gripper system including a gripper 92 on the end of an extender 94. The gripper 92 may be any of a vacuum gripper, an electrostatic gripper, or a magnetic gripper etc. The end effector system 90 also includes a secondary retention system including two or more constricting actuators 96 (e.g., pinch grippers), that may be rotated with respect to pivot locations 98 such that a portion of each actuator 96 may engage a portion of an object to thereby secure the object.

Figure 6A:
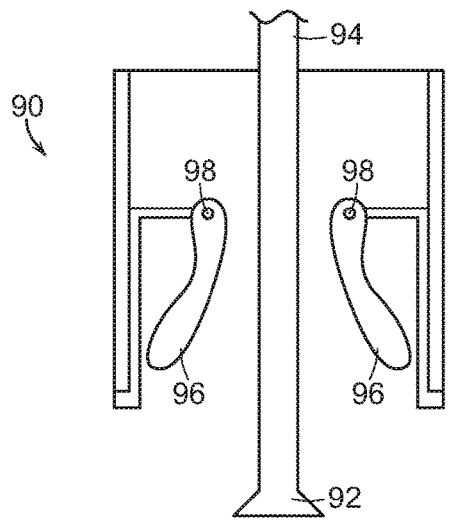
FIGS. 6A-6D show illustrative diagrammatic sectional views of the end effector portion in accordance with a further embodiment including gripping retention actuators during acquisition and retention of an object.
Figure 6C:
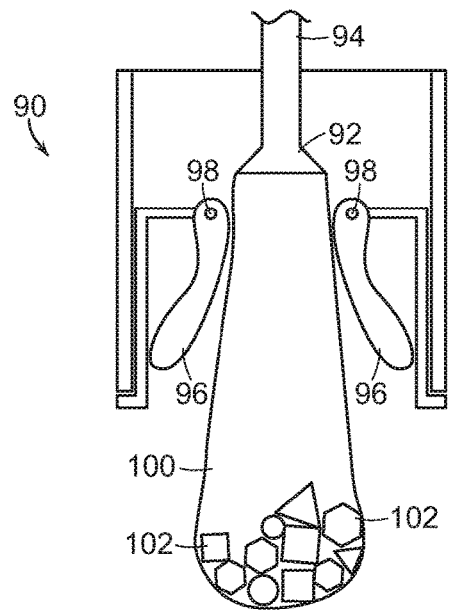
Figure 6B:
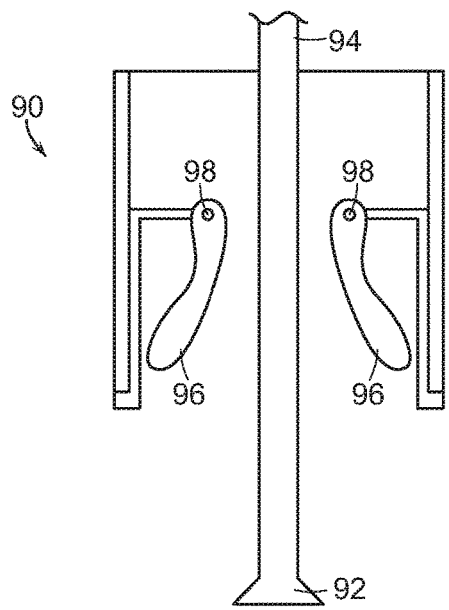
Figure 6D:
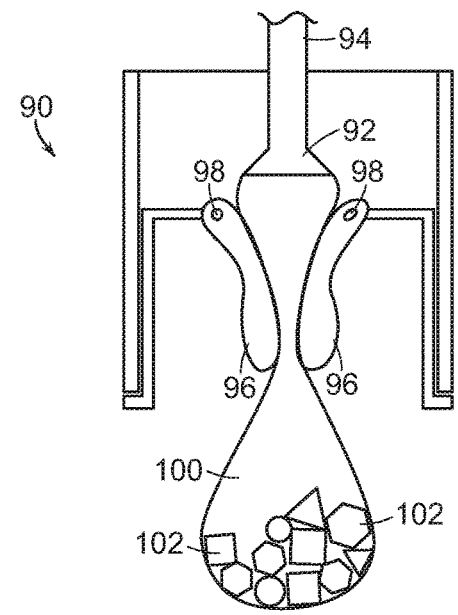

In particular, as shown in FIG. 6B, the actuator 92 may be extended to engage an object such as a bag 100 that includes loose items 102. As shown in FIGS. 6C and 6D, the bag 100 may be acquired by the gripper 92, and the constricting actuators 96 may then be rotated to secure the bag 100 within the end effector system 90.

Figure 7A:
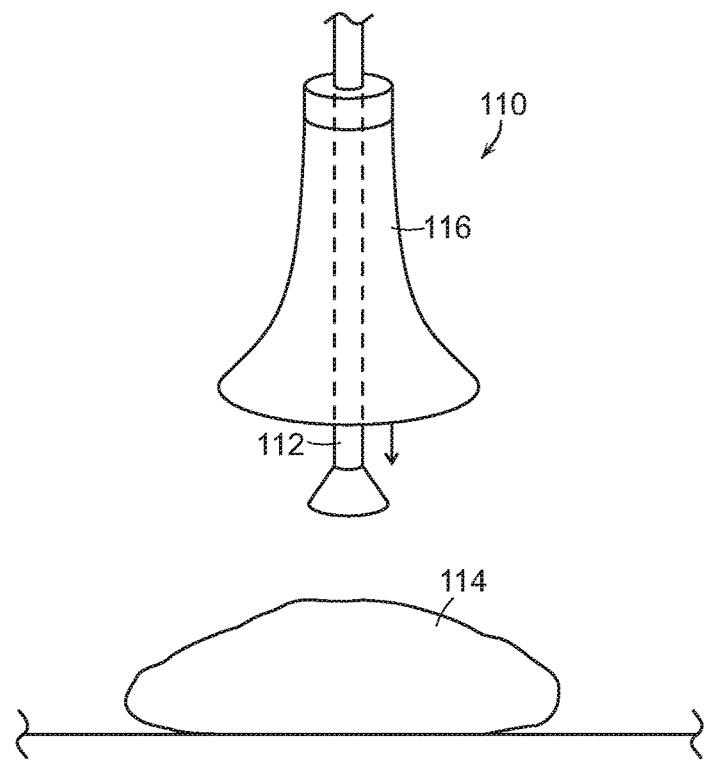
FIGS. 7A and 7B show illustrative diagrammatic sectional views of the end effector portion in accordance with a further embodiment including a retention shroud during acquisition and retention of an object.
Figure 7B:
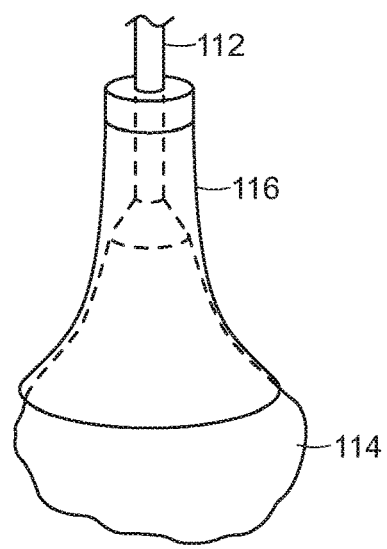

FIGS. 7A and 7B show an end effector 110 in accordance with another embodiment of the invention that includes a first portion 112 having a vacuum cup that may be actuated to engage an object 114, and then may withdraw the grasped object within a second portion 116 in the form of a shroud. In various embodiments, the first portion 112 may move toward the object while the shroud 116 remains fixed, or in other embodiments, the first portion may be fixed, and the shroud 116 may be actuated to move toward the object 114 once grasped.

Figure 8A:
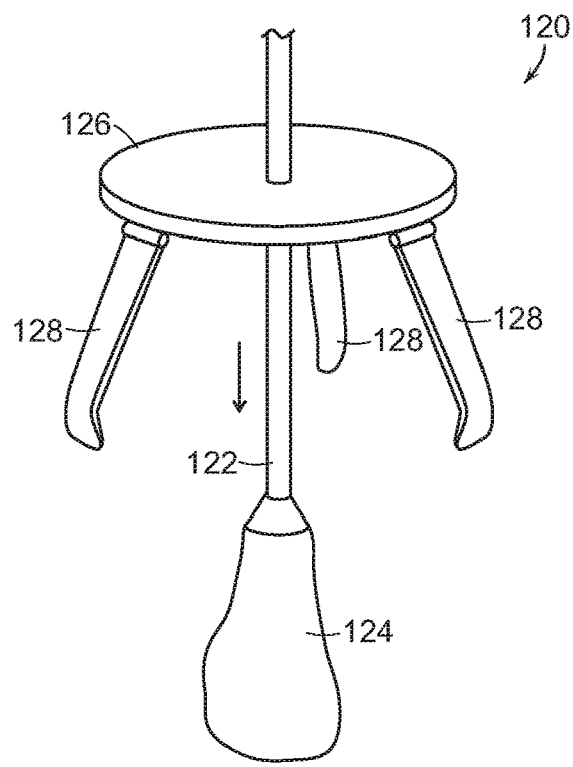
FIGS. 8A and 8B show illustrative diagrammatic sectional views of the end effector portion in accordance with an embodiment including further gripping retention actuators during acquisition and retention of an object.
Figure 8B:
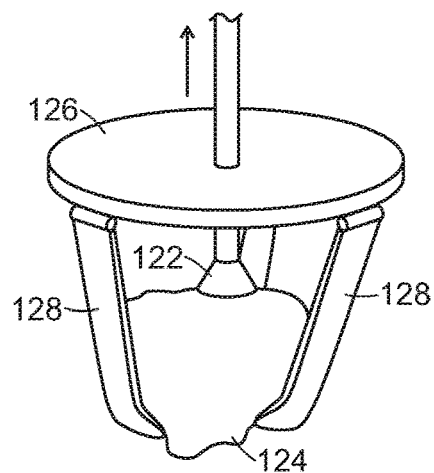

FIGS. 8A and 8B show an end effector 120 in accordance with a further embodiment of the invention that includes a first portion 122 having a vacuum cup that may be actuated to engage an object 124, and then may withdraw the grasped object 124. A second portion 126 that includes two or more paddles 128 then move radially inward as shown at A to secure the grasped object 124.

Figure 9A:
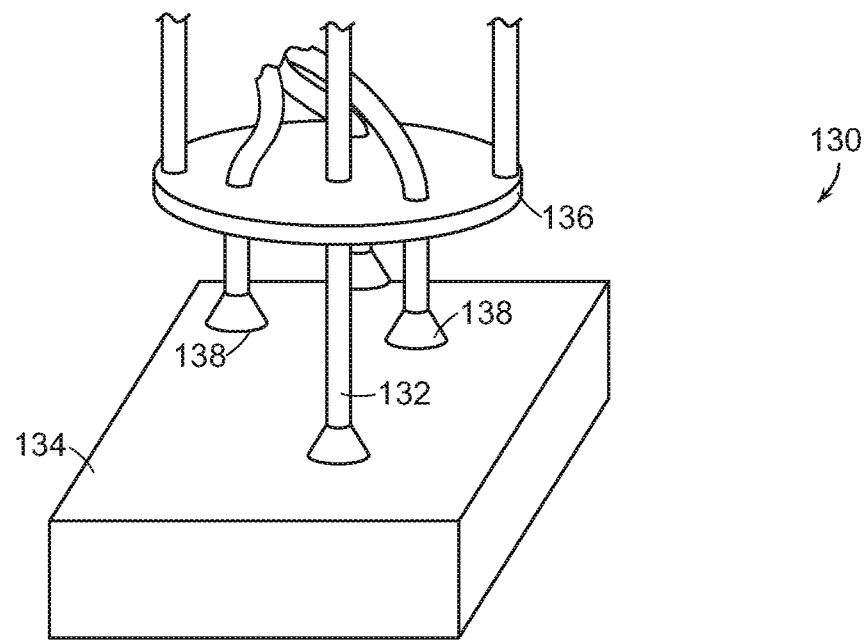
FIGS. 9A and 9B show illustrative diagrammatic sectional views of the end effector portion in accordance with an embodiment including a further arrangement of vacuum cups during acquisition and retention of an object.
Figure 9B:
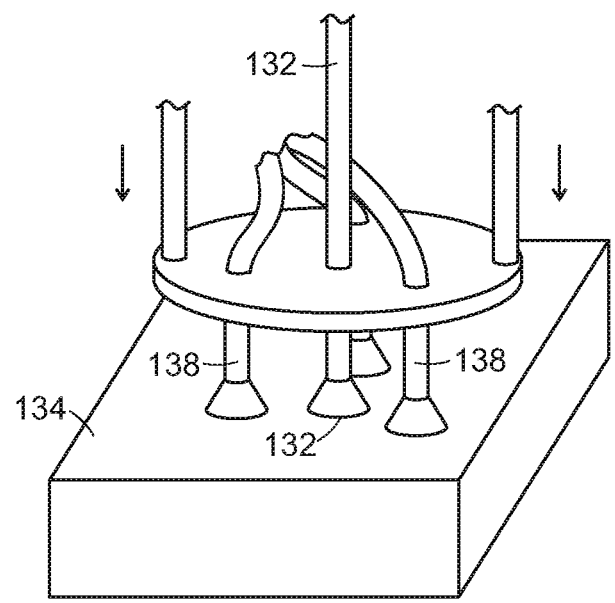

FIGS. 9A and 9B show an end effector 130 in accordance with a further embodiment of the invention that includes a first portion 132 having a vacuum cup that may be actuated to engage an object 134. The object 134 is then withdrawn toward a second portion 136 that includes one or more additional vacuum cups 138 (three are shown) to secure the object 134 during transport. In accordance with further embodiments, the first portion 132 may be fixed with respect to an articulated arm, and the second portion 136 may be lowered onto the object 134.

Figure 10A:
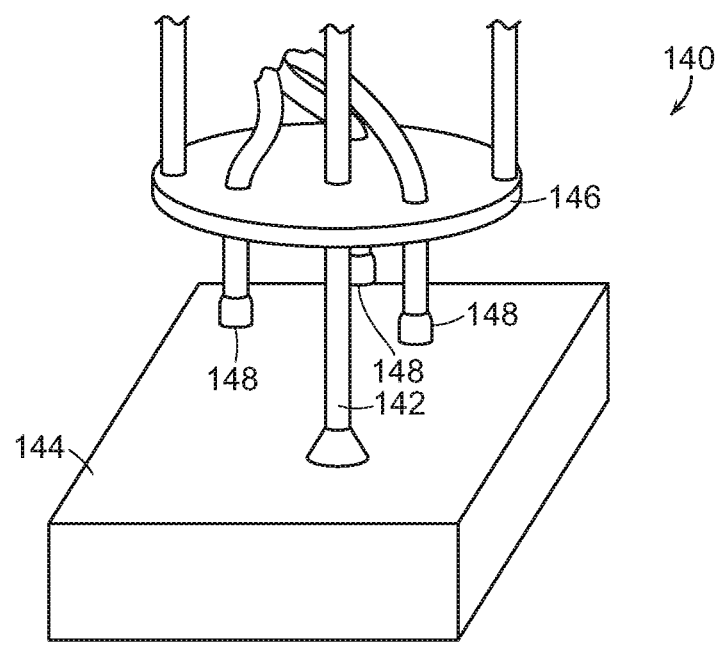
FIGS. 10A and 10B show illustrative diagrammatic sectional views of the end effector portion in accordance with an embodiment including retention stabilizing pads during acquisition and retention of an object.
Figure 10B:
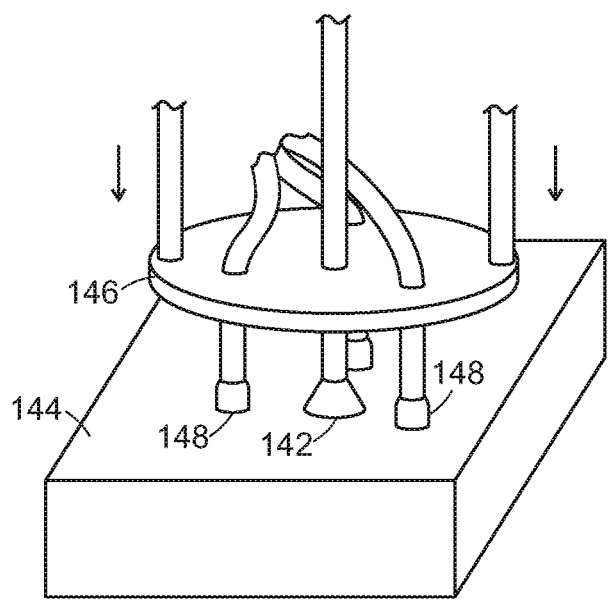

FIGS. 10A and 10B show an end effector 140 in accordance with a further embodiment of the invention that includes a first portion 142 having a vacuum cup that may be actuated to engage an object 144. The object 144 is then withdrawn toward a second portion 146 that includes one or more compliant pads 148 to secure the object 144 during transport. In accordance with further embodiments, the first portion 142 may be fixed with respect to an articulated arm, and the second portion 146 may be lowered onto the object 144.

Figure 11:
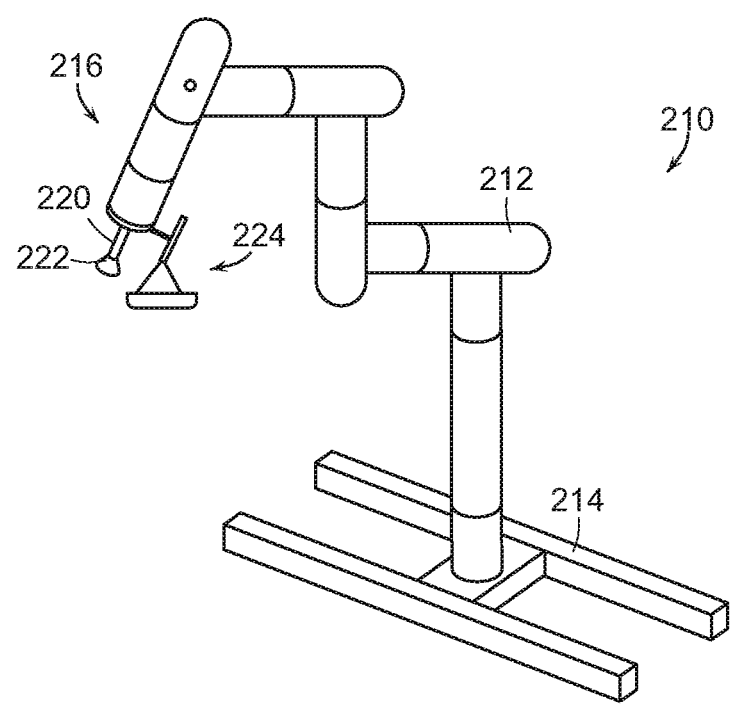
FIG. 11 shows an illustrative diagrammatic view of a system in accordance with a further embodiment of the present invention that includes a retention tray.

FIG. 11 shows a robotic system 210 in accordance with further embodiments of the invention that includes an articulated arm 212 on a base 214, and an end effector system 216. The end effector system may include a primary gripper system including a gripper 222 on the end of an extender 220, as well as secondary retention system 224 as discussed in more detail below with reference to FIGS. 12A-12F. As each of the acquisition element and the transportation element may vary, many different embodiments are possible. The gripper in each of the embodiments, for example, may be any of a vacuum gripper, an electrostatic gripper, or a magnetic gripper etc.

FIGS. 12A-12F diagrammatically show views of the end effector system 216 in accordance with an embodiment of the present invention that includes a primary gripper system including the gripper 222 on the end of the extender 220. The secondary retention system 224 includes a suspended cup 226 that may be mounted on an actuated member 228 such that the suspension point of the cup 226 may be moved relative to the base of the end effector system 216.

Figure 12A:
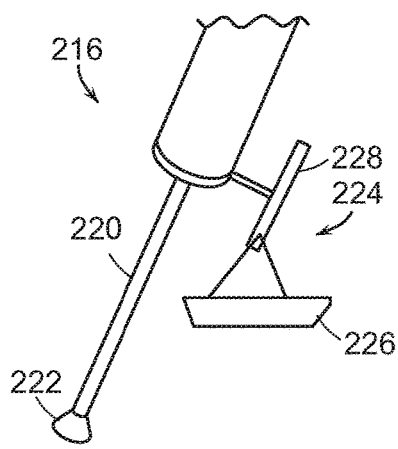
FIG. 12A-12F show illustrative diagrammatic sectional views of the end effector portion in accordance with an embodiment including a retention tray during acquisition, retention and release of an object.
Figure 12C:
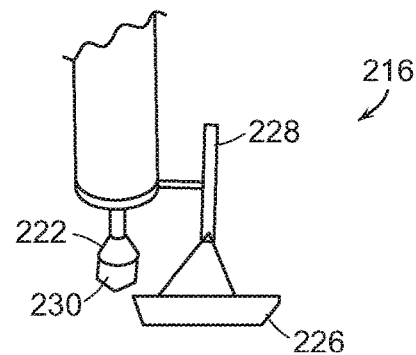
Figure 12B:
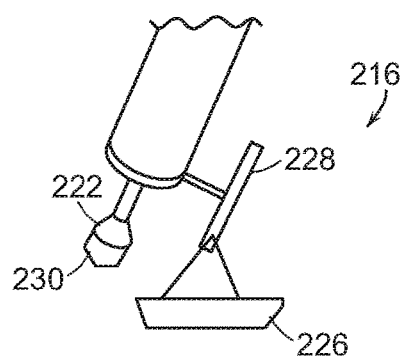
Figure 12D:
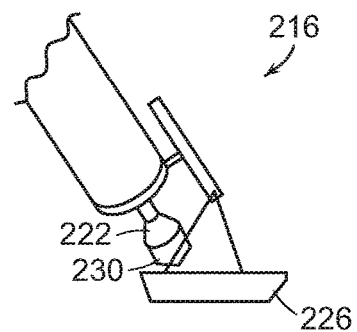
Figure 12E:
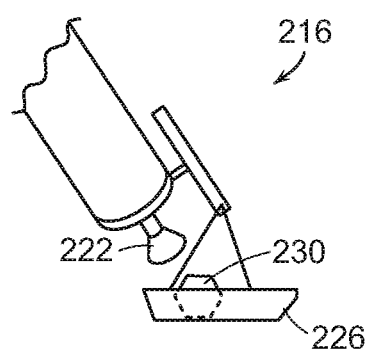
Figure 12F:
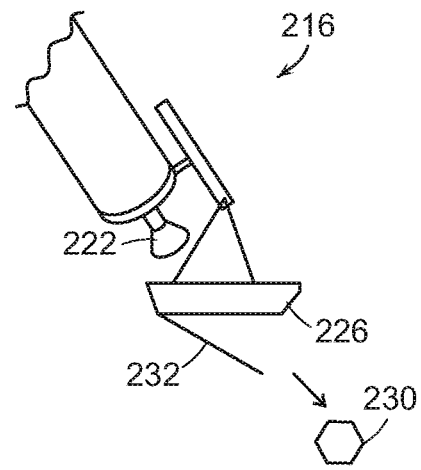

As shown in FIGS. 12A and 12B, the gripper 222 may engage and acquire an object 230, and bring the object 230 toward the suspended cup 226. As shown in FIGS. 12C and 12D, the end effector 216 may then be rotated, causing the suspended cup to move below the object 230. As shown in FIG. 12E, the object 230 may then be dropped into the suspended cup 226. The robotic system may, in certain applications, acquire and place many such objects into a cup prior to transport. Following transport to an output destination, in certain embodiments, the cup 226 may include a releasable bottom 232 that may be actuated to drop the one or more objects into the output destination.

Figure 13:
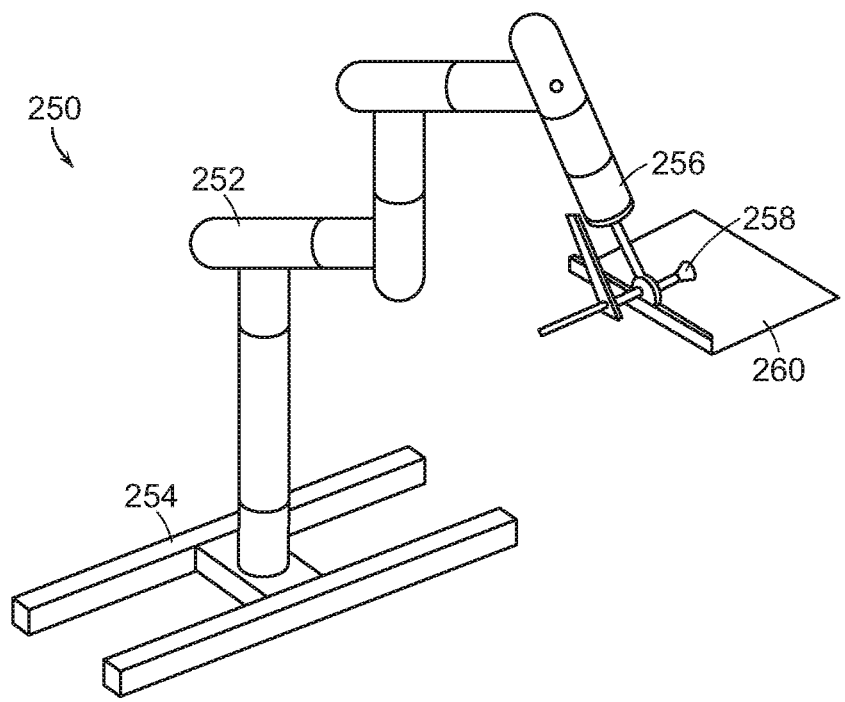
FIG. 13 shows an illustrative diagrammatic view of a system in accordance with a further embodiment of the present invention that includes a retention support.
Figure 14A:
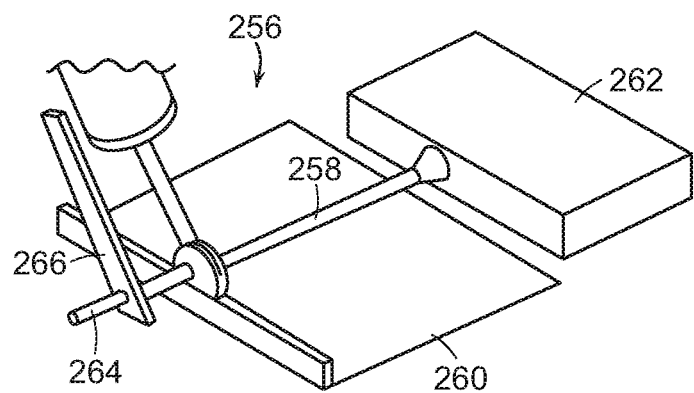
FIGS. 14A and 14B show illustrative diagrammatic sectional views of the end effector portion in accordance with an embodiment including a retention support during acquisition, retention and release of an object.
Figure 14B:
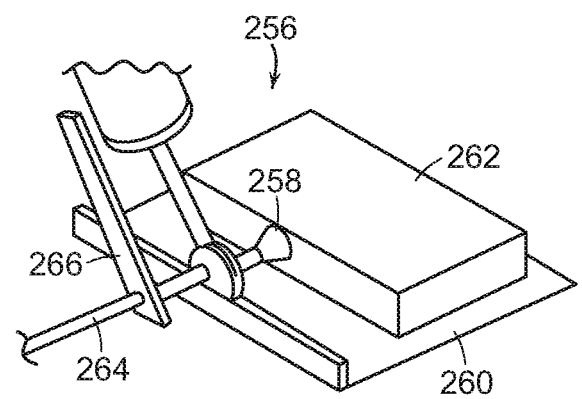
Figure 15:
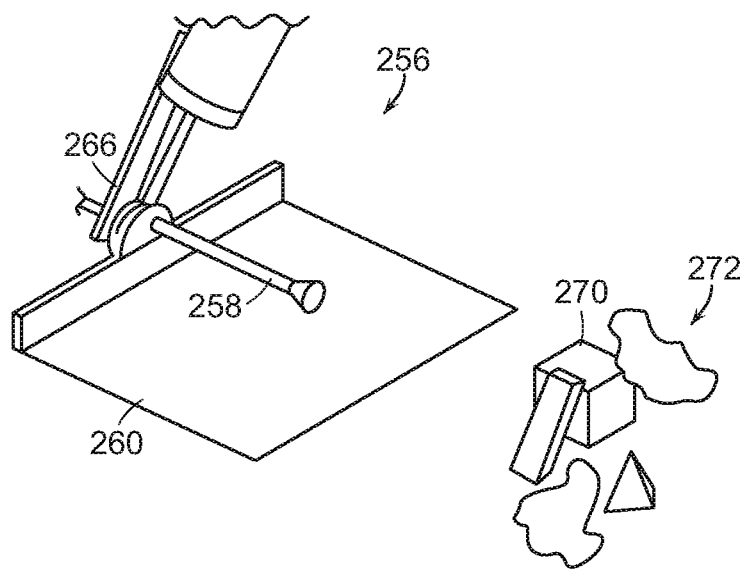
FIG. 15 shows an illustrative diagrammatic view of the end effector system of FIG. 13 approaching a jumble of objects.
Figure 16A:
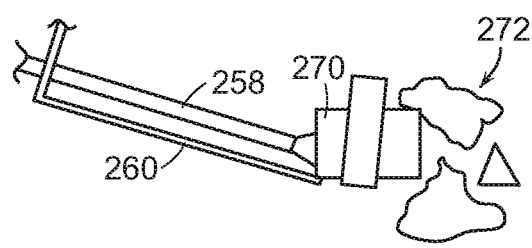
FIGS. 16A and 16B show illustrative diagrammatic sectional views of the end effector portion in accordance with an embodiment of FIG. 15 including a retention support during acquisition and retention of an object.
Figure 16B:
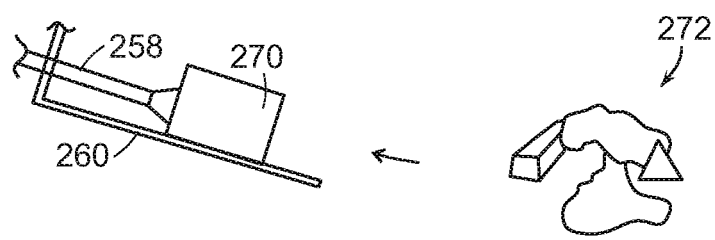

FIG. 13 shows a system 250 that includes an articulated arm 252 on a base 254 as well as an end effector portion 256. The end effector portion 256 includes a primary acquisition portion 258 and a secondary retention system 260. As further shown in FIGS. 14A and 14B, the primary acquisition system includes a vacuum cup on an actuator shaft 264 that passes through an actuatable magnetic coil within arm 266. The secondary retention system 260 includes a tray for supporting the object 262 once grasped as shown in FIG. 14B. As shown in FIG. 15, such an end effector portion 256 may also be employed to selectively pull one object (e.g., 270) from a mix of objects 272. As shown in FIGS. 16A and 16B, the primary acquisition system 258 may acquire the object 270, and the secondary retention system may then support the retained object 270.

Figure 17:
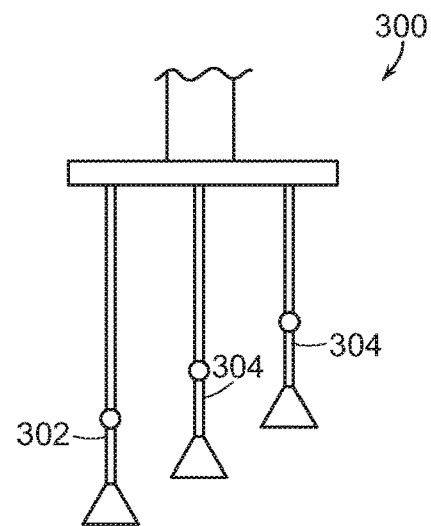
FIG. 17 shows an illustrative diagrammatic view of a system in accordance with a further embodiment of the present invention that includes multiple vacuum cups.
Figure 18A:
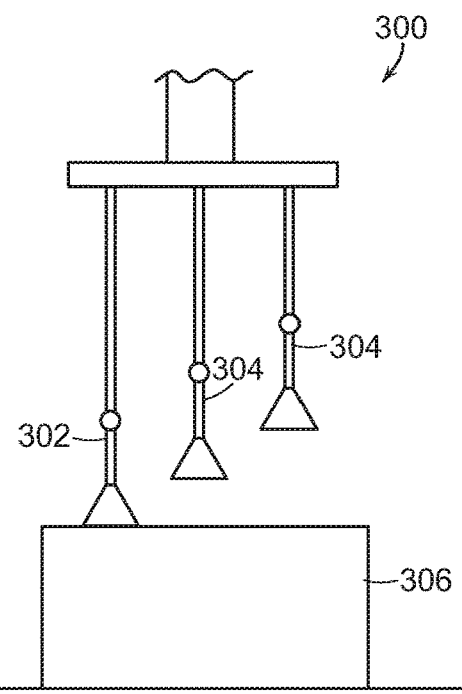
FIGS. 18A-18C show illustrative diagrammatic sectional views of the end effector portion in accordance with an embodiment including multiple vacuum cups during acquisition and retention of an object.
Figure 18B:
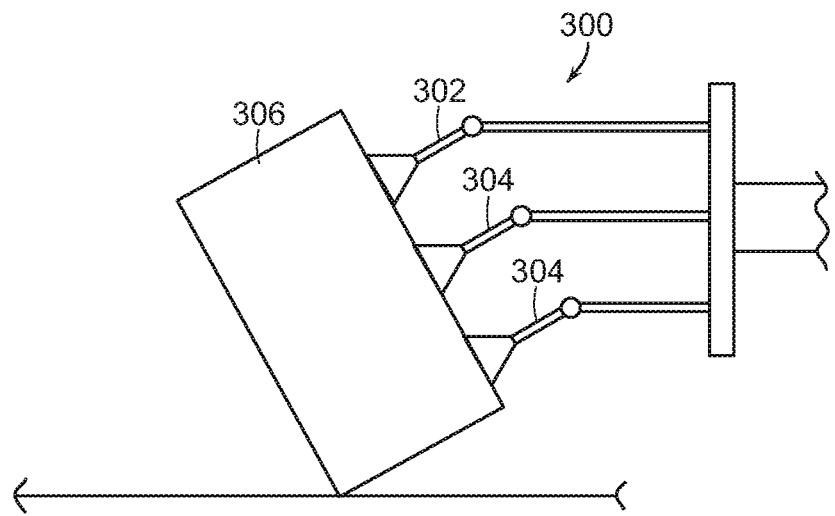

In accordance with further embodiments, and as shown in FIG. 17, a system 300 of the invention may provide an end effector system that includes a primary acquisition system 302 and a secondary retention system 304, each of which includes a vacuum cup and a pivot joint. When the primary acquisition system 302 engages an object 306 (as shown in FIG. 18A), the end effector then rotates (as shown in FIG.

Figure 18C:
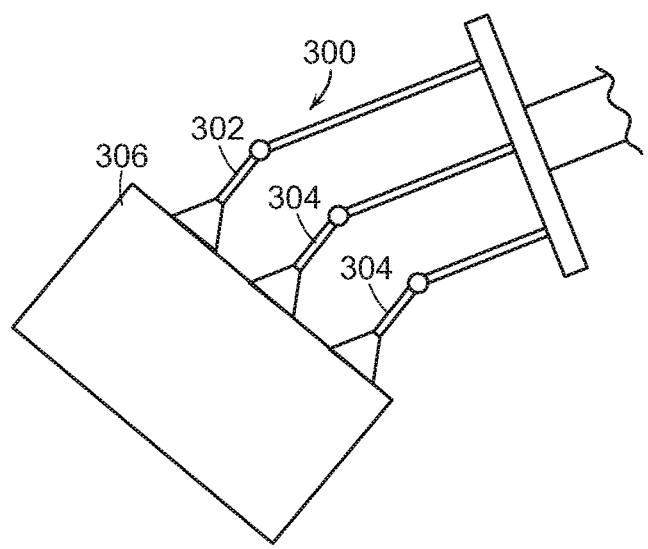

18B) such that the secondary retention system 304 also grasp the object 306 so that it may then be lifted and moved (as shown in FIG. 18C).

Figure 19A:
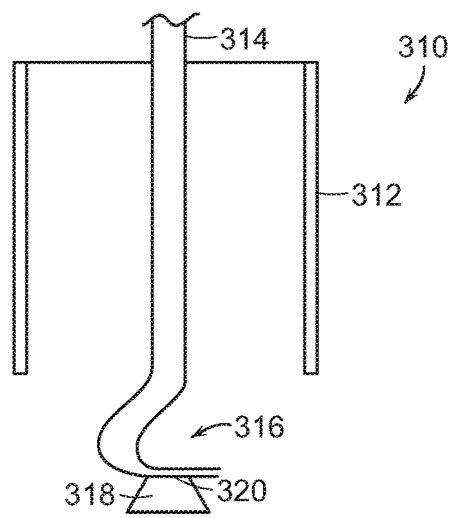
FIGS. 19A and 19B show illustrative diagrammatic sectional views of the end effector portion in accordance with a further embodiment of the present invention employing positive air pressure to create a vacuum at the end effector.
Figure 19B:
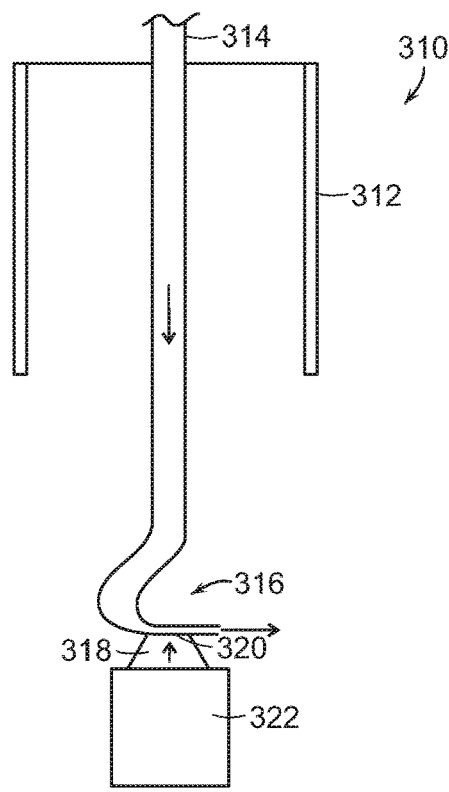

Again, the gripper attached to the programmable motion extender in each of the embodiments may be any of a vacuum gripper, an electrostatic gripper, or a magnetic gripper etc. In other embodiments, both the primary gripper system and the secondary retention system may involve a wide variety of acquisition and retention systems. For example, in accordance with further embodiments, any of the above disclosed systems may be provided with a vacuum source at the end effector wherein the vacuum is provided by a Venturi opening at the end effector. FIGS. 19A and 19B show an example of a primary retention system 310 (that may be used with any of the above discussed embodiments), and includes a conduit 314 for selectively providing air at positive pressure to an end effector 318. The conduit (which is provided within a second retention system 312 as discussed above), includes an area of restricted diameter 316 as well as a Venturi opening 320. When positive air pressure is provided (as shown in FIG. 19B), the air blows out the end of the conduit and produces a vacuum source at the opening 320, thereby permitting the end effector 318 to acquire an object 322. Again, such a positive air pressure and Venturi system for providing the vacuum, may be used with each of the above embodiments.

Those skilled in the art will appreciate that numerous modifications and variations may be made to the above disclosed embodiments without departing from the spirit and scope of the present invention.

What is claimed is:

1. A method of engaging and moving an object using a programmable motion system, said method comprising the steps of:
    engaging the object with a primary end effector of a primary acquisition system;
    moving the object toward a secondary retention system;
    retaining the object with the secondary retention system, said step of retaining the object with the secondary retention system being independent of the prior steps of engaging the object and moving the object such that movement of the secondary retention system is not dependent on movement of the primary acquisition system, wherein the secondary retention system includes a retention area that is defined by at least one wall and a floor;
    disengaging the object from the primary acquisition system;
    transporting the object to an output destination; and
    releasing the object from the secondary retention system by dropping the object through the floor of the retention area.

2. The method as claimed in claim 1 wherein said primary acquisition system includes a conduit of air at other than atmospheric pressure for facilitating in providing vacuum pressure at the primary end effector.

3. The method as claimed in claim 2 wherein said air is at a vacuum pressure within the conduit.

4. The method as claimed in claim 2, wherein said air is at a positive pressure and is provided to a Venturi opening at or near the end effector.

5. The method as claimed in claim 2, wherein the step of disengaging the object from the primary acquisition system includes the step of providing the conduit of air at atmospheric pressure.

6. The method as claimed in claim 2, wherein the step of disengaging the object from the primary acquisition system includes the step of providing the conduit of air at a positive pressure.

7. An end effector system for use with a programmable motion system, said end effector system comprising:
    a primary acquisition system that includes a primary end effector that provides a vacuum at an end effector contact surface; and
    a secondary retention system proximate to the primary acquisition system and independently actuatable with respect to the primary acquisition system such that said primary end effector may be used to select an object from a plurality of objects, and the secondary retention system may be independently used to retain the object for rapid transport to an output destination, wherein said secondary retention system includes a retention area for containing the object, wherein the retention area is defined by a retention bin that includes a floor by which the object may be supported during transport, and wherein the floor may be opened to release the object.

8. The end effector system as claimed in claim 7, wherein said primary acquisition system includes a conduit of air at other than atmospheric pressure for facilitating in providing vacuum pressure at the primary end effector.

9. The end effector system as claimed in claim 8, wherein said air is at a vacuum pressure within the conduit.

10. The end effector system as claimed in claim 8, wherein said air is at a positive pressure and is provided to a Venturi opening at or near the end effector.

11. A method of engaging and moving an object using a programmable motion system, said method comprising the steps of:
    engaging the object with an end effector of a primary acquisition system along a first direction;
    moving the object toward a secondary retention system along a second direction that is generally opposite the first direction;
    engaging the object with a secondary retention system through application of forces along third directions that are generally orthogonal to the first and second directions, said step of engaging the object with the secondary retention system being independent of the prior steps of engaging the object with the primary acquisition system and moving the object such that movement of the secondary retention system is not dependent on engagement or movement of the primary acquisition system;
    releasing the object from the primary acquisition system once the object is engaged by the secondary retention system;
    transporting the object to a destination; and
    releasing the object from the secondary retention system involving the application of forces along fourth directions that are generally opposite the third directions.

12. The method as claimed in claim 11 wherein said primary acquisition system includes a conduit of air at other than atmospheric pressure for facilitating in providing vacuum pressure at the end effector.

13. The method as claimed in claim 12 wherein said air is at vacuum pressure, and wherein the secondary retention system substantially surrounds the conduit of air.

14. The method as claimed in claim 12, wherein said air is at a positive pressure and is provided to a Venturi opening at or near the end effector.

15. The method as claimed in claim 11, wherein the secondary retention system includes any of an elastic toroid, restricting actuators or paddles.

16. An end effector system for use in a programmable motion system, said end effector system comprising:
an end effector of a primary acquisition system for engaging an object along a first direction and for moving the object toward a secondary retention system along a second direction that is generally opposite the first direction; and
the secondary retention system for engaging the object through application of forces along third directions that are generally orthogonal to the first and second directions, said secondary retention system being independent of the primary acquisition system such that movement of the secondary retention system is not dependent on engagement or movement of the primary acquisition system, and such that the object is releasable from the primary acquisition system to the secondary retention system once the object is engaged by the secondary retention system and is releasable from the secondary retention system, wherein said primary acquisition system includes a conduit of air at vacuum pressure, and wherein the secondary retention system substantially surrounds the conduit of air.

17. The end effector system as claimed in claim 16, wherein the secondary retention system includes any of an elastic toroid, restricting actuators or paddles.

18. A method of engaging and moving an object using a programmable motion system, said method comprising the steps of:
engaging the object with an end effector of a primary acquisition system along a first direction;
moving the object toward a secondary retention system along a second direction that is generally opposite the first direction;
engaging the object with the secondary retention system through application of forces along third directions that are generally orthogonal to the first and second directions, said step of engaging the object with the secondary retention system being independent of the prior steps of engaging the object with the primary acquisition system and moving the object such that movement of the secondary retention system is not dependent on engagement or movement of the primary acquisition system, wherein said primary acquisition system includes a conduit of air at vacuum pressure, and wherein the secondary retention system substantially surrounds the conduit of air;
releasing the object from the primary acquisition system once the object is engaged by the secondary retention system; and
transporting the object to a destination.

19. The method as claimed in claim 18, wherein the method further includes the step of releasing the object from the secondary retention system.

20. The method as claimed in claim 19, wherein the step of releasing the object from the secondary retention system involves the application of forces along fourth directions that are generally opposite the third directions.

21. The method as claimed in claim 18, wherein the secondary retention system includes an elastic toroid.

22. The method as claimed in claim 18, wherein the secondary retention system includes restricting actuators.

23. The method as claimed in claim 18, wherein the secondary retention system includes paddles.

* * * * *